Patented Nov. 30, 1948

2,455,123

UNITED STATES PATENT OFFICE

2,455,123

ZIRCONIA OPACIFIERS AND METHOD OF MAKING

Loren C. Hurd, Jenkintown, and Allen J. Vander Weyden and James D. Stroupe, Philadelphia, Pa., assignors to Rohm & Haas Company, Philadelphia, Pa., a corporation of Delaware No Drawing. Application September 10, 1946
Serial No. 696,036

8 Claims. (Cl. 106—312)

This invention relates to zirconia opacifiers and pigments which can be used in the ceramic, paint, rubber, and allied industries.

It is well known that zirconia, $ZrO_2$, exists in at least three allotropic forms, the amorphous form, the tetragonal form, and the monoclinic form. The monoclinic form is recognized as the high temperature form because the amorphous and tetragonal forms are converted into the monoclinic form when heated to high temperatures. Thus, for example, pure tetragonal zirconia can be converted to monoclinic zirconia by heating to about 600° C. The monoclinic form is considerably more desirable as an opacifier in the ceramic industry than are the other two forms of zirconia. The former is characterized by a resistance to fluxing solvents and, hence, does not dissolve, with attendant loss of opacity, in ceramic glazes and the like, whereas the latter are not so characterized. Furthermore, the monoclinic form of zirconia is free of dimensional change when ignited above 600° C., for example, in the range of glazing temperatures. Hence, substantial advantages are gained when opacifiers containing zirconia in the monoclinic form are used.

While pure tetragonal zirconia changes to the monoclinic variety at about 600° C., much higher temperatures are required when the zirconia is contaminated with silica, as is usually the case with commercial or technical grades of zirconia. These grades of zirconia may also contain other impurities such as iron compounds, sodium oxide, and other metallic oxides. In such grades, the zirconia and silica are actually coprecipitated and are, therefore, in extremely intimate contact. The contaminating silica exerts an inhibiting action on the conversion of zirconia, and the extent of this inhibiting action depends upon the amount of silica and the intimacy of its contact or association with the zirconia. Thus, a very small amount of silica in intimate association with zirconia—for example, when coprecipitated with the zirconia—may have as great an inhibiting effect as a much larger amount of silica in a coarse form or in less intimate association. The presence of silica may effectively raise the conversion temperature of zirconia by 500 degrees centigrade or more.

When high conversion temperatures are employed, disadvantages result. For example, at the high temperatures, slagging or mineralization takes place. Such slagging makes the product unusually hard and, as a result, the material can be pulverized only with difficulty. Frequently the product is so hard that it abrades the pulverizing equipment and becomes contaminated with the metal, acquires a gray cast, and is entirely unsuited as a white opacifier.

Also, at the higher conversion temperatures, the presence of iron, usually in the form of the oxide, $Fe_2O_3$, in technical grades of zirconia manifests itself by imparting a most objectionable yellowish or brownish color to the zirconia, which reduces the quality of the latter as a white opacifier. In order to produce white opacifiers, heretofore, from iron-contaminated and silica-contaminated zirconia as a raw material, it has been necessary to remove the iron to prevent yellowing.

The process of this invention avoids the difficulties encountered heretofore. Such process comprises heating iron-contaminated and silica-contaminated zirconia to a maximum temperature of 950° C. in the presence of small amounts of lithia. The lithia overcomes the inhibiting action of the silica, and, as a result, the zirconia is converted to the monoclinic form below the temperatures at which discoloration, due to iron, or slagging occurs. The lithia appears to function as a promoter or catalyst in that it aids in the conversion of silica-contaminated zirconia into the monoclinic form at lower temperatures than are required in the absence of the lithia. By this process, an opacifier is obtained which is both white and slag-free and which, nevertheless, contains iron impurities.

Lithia, $Li_2O$, may be used per se, or equivalent amounts of other lithium compounds, which decompose to lithia on being heated, may be employed. Examples of the latter are lithium hydroxide and lithium carbonate. The lithia or its equivalent, preferably in a finely divided form, is mixed with the silica-contaminated zirconia during or preferably before the heating operation. Mixing can be done in conventional equipment such as Werner-Pfleiderer or Day mixers.

The amount of lithia required to bring about this result depends upon the effective amount of silica which is present. Normally, about 6% to about 12% of silica is present in technical zirconia. There are instances, however, wherein the amount may be above or below this range. In some cases, as in the preparation of refractory mixtures, the amount of silica may be as high as about 33% of the mixture. This is the approximate theoretical amount which can react with zirconia to form zirconium silicate. This invention embraces a process wherein zirconia contaminated with from about 0.1% to about 33% of silica may be converted to the monoclinic form by heating at a temperature from about 600° C. to 950° C. It is particularly valuable when applied to technical zirconia containing about 6% to about 12% of silica. The amount of lithia used in accordance herewith ranges from about 0.25% to about 5.0%, based on the amount of the contaminated zirconia. In most instances, for example where the silica content is within the range of about 6% to about 12%, it is preferred to use from about 0.5% to about 1.5% of lithia. The required amount of lithia is roughly proportional to the effective amount of inhibiting silica. It is further to be understood that the effective amount of inhibiting silica is determined by the absolute amount of silica and the extent to which it is intimately in contact with the zirconia, coprecipitated silica exerting a greater inhibitory effect than coarse or admixed silica.

The temperature of heating is a particularly critical factor in the conversion of zirconia from the amorphous or tetragonal forms to the monoclinic form. Conversion is more rapid as the temperature is raised. In accordance herewith, the range of temperatures which may be employed is from about 600° C. to 950° C. The lower limit of about 600° C. is the approximate conversion temperature of pure tetragonal zirconia. Therefore, temperatures in the neighborhood of 600° C. are used only when the amount of contaminating silica is very low, e. g., of the order of 0.1%. The preferred temperature range within which the operation appears to be most efficient is about 700° C. to about 850° C. This latter range is particularly suitable for the conversion of technical zirconia which contains approximately 6% to 12% of coprecipitated silica.

The length of time of heating required to convert any given batch of zirconia will depend upon the size of the batch, the heating equipment and temperature employed, and the amount of silica and lithia present in the batch. Such factors are illustrated in the examples below. A convenient way of following the course of conversion is by means of X-ray diffraction. Heating until examination shows substantially complete conversion to the monoclinic form may be carried out in any suitable furnace, such as a rotary, muffle, or Wedge furnace. After being heated sufficiently, the mass is cooled and pulverized until only 0.5% or less of the product is retained on a 325 mesh screen.

In the above disclosure and in the examples and claims below, the percentages given for the oxides of iron, silicon, and lithium are based on the total mixture of these oxides and zirconia—not on the zirconia alone. Thus, in technical zirconia containing from about 6% to about 12% of silica, it is to be understood that the silica content is from about 6% to about 12% of the entire technical mixture.

This invention comprises producing white, slag-free, zirconia pigments or opacifiers by heating zirconia, contaminated with about 0.1% to about 4.0% of iron calculated as $Fe_2O_3$ and with about 0.1% to about 33% of silica, from about 600° C. to a maximum temperature of 950° C. in the presence of about 0.25% to about 5.0% of lithia until the zirconia is converted into the monoclinic form and then cooling and pulverizing the product. The invention is not to be confused with the manufacture of refractory materials. We are aware that frits, glazes, and the like, containing silica and zirconia and in which lithia functioned as a flux, have been made at temperatures above 1000° C., but we are not concerned with such operations which involve fluxing, fusing, or liquefying the oxides. This invention relates to the manufacture of opacifiers, as the following examples illustrate.

In the examples below, a technical grade of zirconia was used which contained 8% of coprecipitated silica and 0.5% of iron oxide, $Fe_2O_3$. It was made by fusing zircon sand and sodium hydroxide, washing to remove sodium silicate, and hydrolyzing to precipitate zirconia. During the processing some silica also coprecipitated, and iron and negligible amounts of other impurities were carried along. The precipitated zirconia was filtered, washed, and dried. The product was typical of a technical grade of zirconia.

*Example 1*

A. Three hundred pounds of technical grade zirconia was mixed in a Day mixer with lithium carbonate in an amount (7.4 pounds) equivalent to three pounds of lithia. One hundred pounds of the mixture was heated in a rotary furnace for a quarter hour at a temperature of 950° C., after which it was dropped into cooling pans. The product, after being cooled to room temperature, was ground in a pulverizer until less than 0.5% was retained on a 325 mesh screen.

X-ray diffraction tests showed that the zirconia had been converted to the monoclinic form to an extent of over 90%. The product, a white opacifier, was used in a standard enamel formulation:

| | Pounds |
|---|---|
| Antimony-free frit | 100 |
| Zirconia opacifier prepared as above noted | 3 |
| Clay | 7 |
| Water to spraying consistency. | |

This enamel was sprayed onto a steel panel coated with a conventional ground coat and was fired at 1540° F. (838° C.). The finished panel had excellent gloss, whiteness, and general appearance.

B. A second one hundred pound portion of the technical zirconia-lithia mixture was heated, in the manner described above, for one-half hour at 900° C. It was tested in the manner described and was found to contain zirconia in the monoclinic form only. It produced a white, glossy enamel when incorporated with frit, clay, and water, and when fired as above described under A.

C. The third one hundred pound portion was heated for one hour at 850° C. and was tested by the method of A above. X-ray studies showed that 90% of the zirconia was in the monoclinic form. The product, as shown by the standard enamelling test of A above, was an excellent white opacifier for vitreous enamels.

*Example 2*

A. As a basis for comparison, a portion of the same batch of technical zirconia as employed in Example 1 was heated in the absence of lithia for two hours at 950° C. X-ray diffraction tests showed that the zirconia in the product was in the tetragonal form and that no conversion to the monoclinic form had taken place.

B. A second portion of the same batch of technical zirconia was heated at 1100° C. for two hours. X-ray diffraction tests showed that the zirconia had been converted to the monoclinic form. The product, however, was exceptionally hard, was pulverized only with difficulty, and abraded the pulverizing mill. In addition, an enamel prepared with the material according to the procedure of A of Example 1 above had a very definite and objectionable yellowish cast.

Example 3

In a comparison of the effect of lithium oxide and the oxides of sodium and potassium, four portions of one hundred grams each of the same batch of technical zirconia were used. To three portions were added, respectively, the carbonates of lithium, sodium, and potassium in amounts equivalent to 1.0 gram of $Li_2O$. The fourth portion served as a blank. The individual mixtures were heated for thirty minutes in an electric furnace at 1050° C. and, after being cooled, were tested by X-ray diffraction for their content of monoclinic zirconia. It was found that the blank, thus heated, contained 10% $m$-$ZrO_2$ (monoclinic zirconia), the potassium-treated product contained 15% $m$-$ZrO_2$, the sodium-treated material contained 20% $m$-$ZrO_2$, while the product resulting from the use of lithia contained over 50% $m$-$ZrO_2$.

It is apparent from the above examples that lithia promotes the conversion of zirconia to the monoclinic form at comparatively low temperatures and that the resultant low-temperature conversion yields a product which is white and which may be easily pulverized. It is also evident that of the three alkali metal oxides, $Li_2O$, $Na_2O$, and $K_2O$, lithium oxide is unusual in its catalytic effect.

We claim:

1. A process for producing white opacifiers from zirconia which is contaminated with about 0.1% to about 33% of intimately associated silica and with about 0.1% to about 4.0% of iron, calculated as $Fe_2O_3$, which comprises converting said zirconia into the monoclinic form by heating at a temperature from about 600° C. to 950° C. in the presence of about 0.25% to about 5.0% of lithia and cooling and pulverizing the resultant product.

2. A process for producing white opacifiers from zirconia which is contaminated with about 0.1% to about 33% of coprecipitated silica and with about 0.1% to about 4.0% of iron, calculated as $Fe_2O_3$, which comprises converting said zirconia into the monoclinic form by heating at a temperature from about 600° C. to 950° C. in the presence of about 0.25% to about 5.0% of lithia and cooling and pulverizing the resultant product.

3. A process for producing white opacifiers from a technical grade of tetragonal zirconia which is contaminated with about 6% to about 12% of coprecipitated silica and with about 0.2% to about 0.6% of iron, calculated as $Fe_2O_3$, which comprises converting said tetragonal zirconia into the monoclinic form by heating at a temperature from about 600° C. to 950° C. in the presence of 0.5% to about 1.5% of lithia and cooling and pulverizing the resultant product.

4. A process for producing white opacifiers from zirconia which is contaminated with about 0.1% to about 33% of coprecipitated silica and with about 0.1% to about 4.0% of iron, calculated as $Fe_2O_3$, which comprises converting said zirconia into the monoclinic form by heating at a temperature from about 700° C. to about 850° C. in the presence of about 0.25% to about 5.0% of lithia and cooling and pulverizing the resultant product.

5. As a new composition of matter, a white, soft, and slag-free opacifier consisting of monoclinic zirconia which is contaminated with 0.1% to about 33% of silica and 0.1% to about 4% of iron, calculated as $Fe_2O_3$, and 0.25% to about 5% of lithia.

6. As a new composition of matter, a white, soft, and slag-free opacifier consisting of monoclinic zirconia which is contaminated with about 6% to about 12% of silica and about 0.2% to about 0.6% of iron, calculated as $Fe_2O_3$, and about 0.5% to about 1.5% of lithia.

7. As a new composition of matter, a white, soft, and slag-free opacifier consisting of monoclinic zirconia which is contaminated with 0.1% to about 33% of coprecipitated silica and 0.1% to about 4% of iron, calculated as $Fe_2O_3$, and 0.25% to about 5% of admixed lithia.

8. As a new composition of matter, a white, soft, and slag-free opacifier consisting of monoclinic zirconia which is contaminated with about 6% to about 12% of coprecipitated silica and about 0.2% to about 0.6% of iron, calculated as $Fe_2O_3$, and about 0.5% to about 1.5% of admixed lithia.

LOREN C. HURD.
ALLEN J. VANDER WEYDEN.
JAMES D. STROUPE.

REFERENCES CITED

The following references are of record in the file of this patent:

UNITED STATES PATENTS

| Number | Name | Date |
|---|---|---|
| 2,273,872 | Kinzie | Feb. 24, 1942 |